United States Patent
Washizu

(10) Patent No.: US 10,494,513 B2
(45) Date of Patent: Dec. 3, 2019

(54) RUBBER COMPOSITION AND PNEUMATIC TIRE

(71) Applicant: SUMITOMO RUBBER INDUSTRIES, LTD., Kobe-shi, Hyogo (JP)

(72) Inventor: Kensuke Washizu, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/945,339

(22) Filed: Apr. 4, 2018

(65) Prior Publication Data

US 2018/0291188 A1    Oct. 11, 2018

(30) Foreign Application Priority Data

Apr. 5, 2017 (JP) .................................. 2017-075288

(51) Int. Cl.
  *C08L 9/06* (2006.01)
  *B60C 1/00* (2006.01)
  *B60C 11/00* (2006.01)
  *C08F 236/10* (2006.01)

(52) U.S. Cl.
  CPC .................. *C08L 9/06* (2013.01); *B60C 1/00* (2013.01); *B60C 1/0016* (2013.01); *B60C 11/0008* (2013.01); *C08F 236/10* (2013.01); *B60C 2011/0025* (2013.01); *C08F 2800/20* (2013.01); *C08L 2205/025* (2013.01); *C08L 2205/03* (2013.01)

(58) Field of Classification Search
  CPC ..... B60C 1/00; B60C 11/0008; B60C 1/0016; B60C 2011/0025; C08L 9/06; C08L 2205/025; C08L 2205/03; C08F 2800/20
  See application file for complete search history.

(56) References Cited

U.S. PATENT DOCUMENTS

2012/0010356 A1*  1/2012  Hamann et al. ...... B60C 1/0016
                                                                524/575

FOREIGN PATENT DOCUMENTS

JP           63-101440 A       5/1988

* cited by examiner

*Primary Examiner* — Nathan M Nutter
(74) *Attorney, Agent, or Firm* — Birch, Stewart, Kolasch & Birch, LLP.

(57) ABSTRACT

The present invention provides a rubber composition excellent in grip performance, durability of grip performance, and abrasion resistance. Also provided is a pneumatic tire formed from the rubber composition. The present invention relates to a rubber composition exhibiting a temperature dependence curve of tan δ with a half-width defined by Equation (1) of 45 or less as measured at a strain of 0.1% and a frequency of 10 Hz, the rubber composition having a temperature dependence of hardness defined by Equation (2) of 4.3 or less, the temperature dependence curve having a peak temperature of 10° C. or lower, half-width=(temperature at half-peak height on high temperature side)−(temperature at half-peak height on low temperature side),    Equation (1):

temperature dependence of hardness=(hardness index at 0° C.)/(hardness index at 100° C.).    Equation (2):

2 Claims, 1 Drawing Sheet

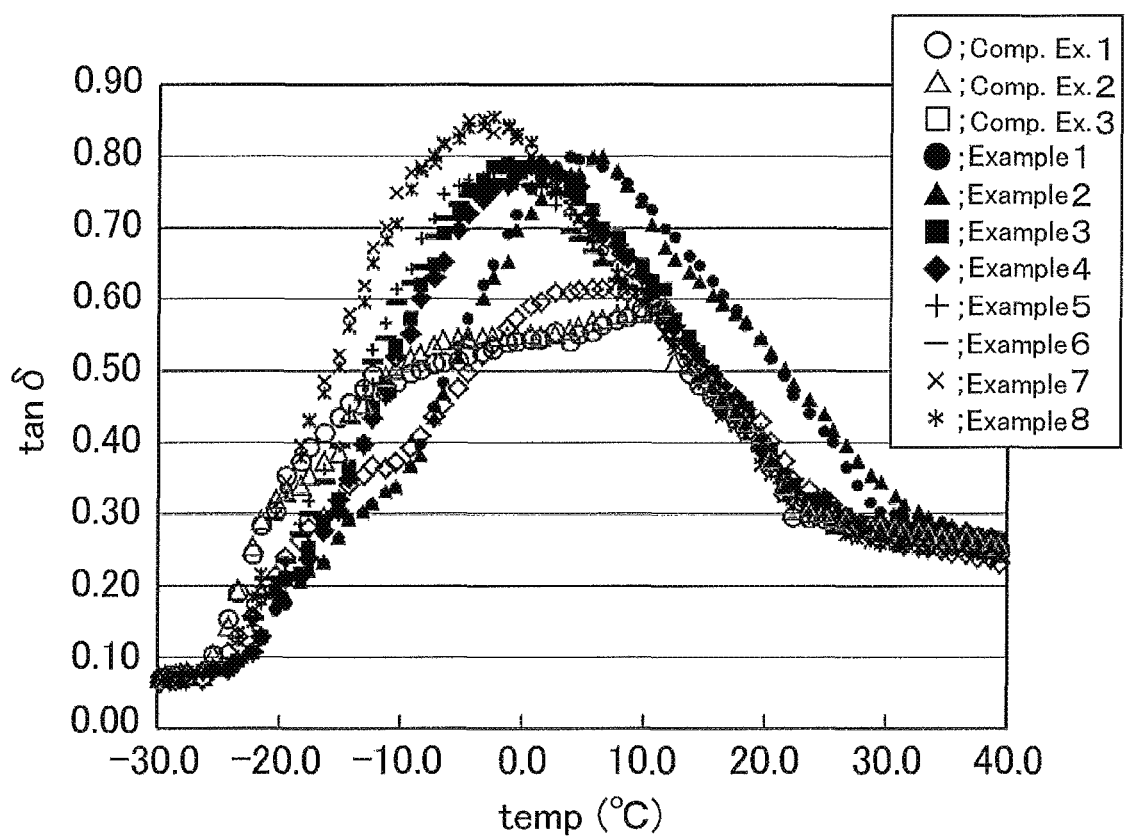

RUBBER COMPOSITION AND PNEUMATIC TIRE

TECHNICAL FIELD

The present invention relates to a rubber composition and a pneumatic tire.

BACKGROUND ART

In general, both high grip performance and abrasion resistance are required of tread rubbers for high performance tires. Conventionally known rubber compositions having high grip performance include: rubber compositions containing styrene-butadiene copolymer rubber (SBR) with a high glass transition temperature (Tg); rubber compositions whose rubber component is loaded with process oil replaced with an equal amount of high softening point resin; rubber compositions highly loaded with softeners or carbon black; rubber compositions containing small particle size carbon black; and rubber compositions containing combinations of the foregoing components.

However, the use of SBR with high Tg can disadvantageously result in an increased temperature dependence so that greater changes in properties are caused by temperature changes, and also in significantly deteriorated processability. Moreover, if the replacement amount is high, the replacement of process oil with high softening point resin can result in an increased temperature dependence due to the presence of the high softening point resin. The use of small particle size carbon black or a large amount of softeners can cause drawbacks such as poor dispersion of carbon black and reduced abrasion resistance.

Patent Literature 1 proposes as a means to solve the above problems a rubber composition containing a partially hydrogenated low molecular weight styrene-butadiene copolymer. However, as described in this document, the degree of hydrogenation is limited because of bleeding of low molecular weight components.

It is thus difficult to improve abrasion resistance and grip performance while ensuring processability and bleed resistance. Moreover, abrasion resistance and grip performance are usually in a trade-off relationship. As described, at present, there is no technique to provide excellent abrasion resistance, grip performance, and durability of grip performance while providing good processability and bleed resistance. Therefore, such a technique is needed.

CITATION LIST

Patent Literature

Patent Literature 1: JP S63-101440 A

SUMMARY OF INVENTION

Technical Problem

The present invention aims to solve the problems and provide a rubber composition excellent in grip performance, durability of grip performance, and abrasion resistance, and a pneumatic tire formed from the rubber composition.

Solution to Problem

The present invention relates to a rubber composition, exhibiting a temperature dependence curve of tan δ with a half-width defined by Equation (1) of 45 or less as measured at a strain of 0.1% and a frequency of 10 Hz, the rubber composition having a temperature dependence of hardness defined by Equation (2) of 4.3 or less, the temperature dependence curve having a peak temperature of 10° C. or lower, half-width=(temperature at half-peak height on high temperature side)−(temperature at half-peak height on low temperature side),     Equation (1):

temperature dependence of hardness=(hardness index at 0° C.)/(hardness index at 100° C.).     Equation (2):

Preferably, the rubber composition contains: a high molecular weight diene polymer having a weight average molecular weight of 100,000 or more; and a low molecular weight diene polymer having a weight average molecular weight of 50,000 or less, and the high molecular weight diene polymer and the low molecular weight diene polymer have respective SP (solubility parameter) values which satisfy the following relationship (3):

(SP value of high molecular weight diene polymer)×2−(SP value of low molecular weight diene polymer)≤19.0.

The present invention also relates to a pneumatic tire, formed from the rubber composition.

Advantageous Effects of Invention

The rubber composition of the present invention exhibits a temperature dependence curve of tan δ with a half-width defined by Equation (1) of 45 or less as measured at a strain of 0.1% and a frequency of 10 Hz. Further, the rubber composition has a temperature dependence of hardness defined by Equation (2) of 4.3 or less. Further, the temperature dependence curve has a peak temperature of 10° C. or lower. Such a rubber composition provides improved grip performance, durability of grip performance, and abrasion resistance.

BRIEF DESCRIPTION OF DRAWINGS

The FIGURE shows temperature dependence curves of tan δ of the examples and comparative examples (vulcanized rubber compositions) measured at a strain of 0.1% and a frequency of 10 Hz.

DESCRIPTION OF EMBODIMENTS

The rubber composition of the present invention exhibits a temperature dependence curve of tan δ with a half-width defined by Equation (1) of 45 or less as measured at a strain of 0.1% and a frequency of 10 Hz. Further, the rubber composition has a temperature dependence of hardness defined by Equation (2) of 4.3 or less. Further, the temperature dependence curve has a peak temperature of 10° C. or lower. Grip performance, durability of grip performance, and abrasion resistance can be simultaneously achieved by satisfying all the requirements with respect to half-width, temperature dependence of hardness, and peak temperature.

Specifically, the rubber composition of the present invention exhibits a temperature dependence curve of tan δ with a half-width of 45 or less as measured in particular at a strain of 0.1% and a frequency of 10 Hz. The smaller the half-width of the tan δ curve prepared under these specific conditions, i.e. the sharper the temperature dependence curve, the higher the grip performance.

Further, the rubber composition of the present invention has a temperature dependence of hardness defined in particular by Equation (2) [(hardness index at 0° C.)/(hardness index at 100° C.)] of 4.3 or less. By adjusting the dependence of hardness measured in particular at 0° C. and 100° C. to a predetermined value or lower, good durability of grip performance, i.e., smaller differences between grip performances during the early, middle, and late phases can be obtained.

Further, the rubber composition of the present invention exhibits a temperature dependence curve of tan δ with a peak temperature of 10° C. or lower as measured in particular at a strain of 0.1% and a frequency of 10 Hz. Particularly when the peak temperature of the tan δ curve prepared under these specific conditions is 10° C. or lower, excellent abrasion resistance can be obtained.

Thus, the rubber composition of the present invention has been accomplished based on the finding (technical idea) that not only high grip performance but also excellent durability of grip performance and abrasion resistance, which is difficult to achieve simultaneously with grip performance, can be obtained by satisfying the requirements: a half-width of a temperature dependence curve of tan δ measured under specific conditions of 45 or less, a peak temperature of the temperature dependence curve of 10° C. or lower, and a temperature dependence of hardness measured in particular at 0° C. and 100° C. of 4.3 or less. Therefore, according to the present invention, it is possible to significantly improve the balance of grip performance, durability of grip performance, and abrasion resistance.

Moreover, the rubber composition satisfying the requirements with respect to half-width, temperature dependence of hardness, and peak temperature, when prepared from appropriately selected components, can also ensure good processability and bleed resistance. Thus, according to the present invention, it is possible to significantly improve the balance of grip performance, durability of grip performance, and abrasion resistance while providing good processability and bleed resistance.

The rubber composition exhibits a temperature dependence curve of tan δ with a half-width defined by Equation (1) of 45 or less as measured at a strain of 0.1% and a frequency of 10 Hz.

half-width=(temperature at half-peak height on high temperature side)−(temperature at half-peak height on low temperature side).  Equation (1):

The temperature dependence curve of tan δ may be prepared as described later in EXAMPLES.

For high grip performance, the half-width defined by Equation (1) is preferably 43 or less, more preferably 40 or less. A smaller half-width is better, and the lower limit is not particularly critical, but is usually 10 or more.

The half-width defined by Equation (1) may be adjusted, for example, by controlling the styrene content of a high molecular weight styrene-butadiene copolymer or a low molecular weight styrene-butadiene copolymer. Specifically, the half-width defined by Equation (1) may be reduced, for example, by reducing the styrene content of a high molecular weight styrene-butadiene copolymer or increasing the styrene content of a low molecular weight styrene-butadiene copolymer. Using these tendencies, it can be adjusted.

The rubber composition has a temperature dependence of hardness defined by Equation (2) of 4.3 or less.

temperature dependence of hardness=(hardness index at 0° C.)/(hardness index at 100° C.)  Equation (2):

The hardness indexes at 0° C. and 100° C. are determined as described in EXAMPLES.

For excellent durability of grip performance, the temperature dependence of hardness defined by Equation (2) is preferably 4.2 or less, more preferably 4.1 or less. A lower temperature dependence of hardness defined by Equation (2) is better, and the lower limit is not particularly critical, but is usually 2.5 or more.

The temperature dependence of hardness defined by Equation (2) may be adjusted, for example, by controlling the styrene content of a high molecular weight styrene-butadiene copolymer or a low molecular weight styrene-butadiene copolymer. Specifically, the temperature dependence of hardness defined by Equation (2) may be reduced, for example, by reducing the styrene content of a high molecular weight styrene-butadiene copolymer or increasing the styrene content of a low molecular weight styrene-butadiene copolymer. Using these tendencies, it can be adjusted.

The rubber composition exhibits a temperature dependence curve of tan δ with a peak temperature of 10° C. or lower as measured at a strain of 0.1% and a frequency of 10 Hz.

The temperature dependence curve of tan δ may be prepared as described later in EXAMPLES.

For high abrasion resistance, the peak temperature is preferably 8° C. or lower, more preferably 7° C. or lower. The lower limit of the peak temperature is not particularly critical, but is preferably −10° C. or higher, more preferably −5° C. or higher.

The peak temperature may be adjusted, for example, by controlling the styrene content of a high molecular weight styrene-butadiene copolymer or a low molecular weight styrene-butadiene copolymer. Specifically, the peak temperature may be reduced, for example, by reducing the styrene content of a high molecular weight styrene-butadiene copolymer or increasing the styrene content of a low molecular weight styrene-butadiene copolymer. Using these tendencies, it can be adjusted.

The rubber component of the rubber composition of the present invention preferably includes a high molecular weight diene polymer having a weight average molecular weight (Mw) of 100,000 or more. Examples of the high molecular weight diene polymer include natural rubber (NR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), acrylonitrile butadiene rubber (NBR), and butyl rubber (IIR). Among these, SBR (hereinafter, also referred to as high molecular weight SBR) is suitable. The use of high molecular weight SBR can ensure grip performance and durability of grip performance and thereby improve the balance of the aforementioned properties.

The high molecular weight diene polymer may be prepared by known methods such as anionic polymerization, solution polymerization, and emulsion polymerization. For example, the polymer may be produced by polymerization using a monolithium initiator such as n-butyllithium or sec-butyllithium or a polyfunctional polymerization initiator such as tetramethylene-1,4-dilithium, dilithiobenzene, dilithiomethane, 1,4-dilithio-2-ethylcyclohexane, or 1,3,5-trilithiobenzene. Commercial products may also be used. The high molecular weight diene polymer may also be one modified with a polar group having affinity for filler, such as an alkoxysilyl group or an amino group.

The high molecular weight diene polymer preferably has a weight average molecular weight (Mw) of 130,000 or more, more preferably 150,000 or more. With a Mw of less than 100,000, the effects of the present invention may not be sufficiently achieved. Although the upper limit of the Mw is not particularly critical as long as processability such as dispersibility of the polymer is not impaired, it is preferably 1,000,000 or less, more preferably 500,000 or less, still more preferably 300,000 or less.

In the present invention, the Mw may be measured as described in EXAMPLES.

The high molecular weight diene polymer preferably has a molecular weight distribution (Mw/Mn) of 0.20 to 2.00, more preferably 0.70 to 1.50, still more preferably 0.85 to 1.35, to ensure grip performance and durability of grip performance and thereby improve the balance of the properties.

Herein, the weight average molecular weight (Mw) and number average molecular weight (Mn) are determined by gel permeation chromatography (GPC) calibrated with polystyrene standards.

The high molecular weight diene polymer preferably has a solubility parameter (SP) value of 17.3 or more, more preferably 17.5 or more, still more preferably 17.7 or more. The SP value is preferably 19.2 or less, more preferably 18.9 or less, still more preferably 18.7 or less. When the SP value falls within the range indicated above, grip performance and durability of grip performance can be ensured, and therefore the balance of the properties can be improved.

In the present invention, the SP value (unit: $MPa^{0.5}$) is calculated by a "group contribution method".

In the case where the high molecular weight diene polymer is high molecular weight SBR, it preferably has a styrene content of 5% by mass or more, more preferably 10% by mass or more, still more preferably 15% by mass or more. With a styrene content of less than 5% by mass, the effects of the present invention may not be sufficiently achieved. The styrene content is also preferably 50% by mass or less, more preferably 40% by mass or less. A styrene content of more than 50% by mass may lead to reduced grip performance or durability of grip performance.

In the present invention, the styrene content is determined by $^1$H-NMR.

The amount of the high molecular weight diene polymer based on 100% by mass of the rubber component is preferably 50% by mass or more, more preferably 80% by mass or more, still more preferably 90% by mass or more, and may be 100% by mass. When the amount is 50% by mass or more, grip performance and durability of grip performance can be ensured, and therefore the balance of the properties can be improved.

For grip performance and other properties, the rubber composition of the present invention preferably contains a low molecular weight diene polymer having a weight average molecular weight (Mw) of 50,000 or less.

The low molecular weight diene polymer may suitably be one that is liquid at room temperature (25° C.), and examples include liquid styrene-butadiene copolymers (liquid SBR), liquid polybutadiene polymers (liquid BR), liquid polyisoprene polymers (liquid IR), and liquid styrene-isoprene copolymers (liquid SIR). Among these, liquid SBR is preferred because then grip performance and durability of grip performance can be ensured, and therefore the balance of the properties can be improved.

The low molecular weight diene polymer preferably has a weight average molecular weight (Mw) of 1,000 to 50,000, more preferably 2,000 to 10,000, still more preferably 3,000 to 7,000. A Mw of less than the lower limit tends not to be effective in improving grip performance and thus tends to result in a small effect to improve the balance of the properties. Also, a Mw of more than the upper limit may lead to deteriorated processability or reduced strength.

The low molecular weight diene polymer preferably has a molecular weight distribution (Mw/Mn) of 0.20 to 2.00, more preferably 0.70 to 1.50, still more preferably 0.85 to 1.35, to ensure grip performance and durability of grip performance and thereby improve the balance of the properties.

The low molecular weight diene polymer preferably has a solubility parameter (SP) value of 17.3 or more, more preferably 17.5 or more, still more preferably 17.7 or more. The SP value is preferably 19.2 or less, more preferably 18.9 or less, still more preferably 18.7 or less. When the SP value falls within the range indicated above, grip performance and durability of grip performance can be ensured, and therefore the balance of the properties can be improved.

In the case where the low molecular weight diene polymer is liquid SBR, it preferably has a styrene content of 5% by mass or more, more preferably 10% by mass or more, still more preferably 15% by mass or more. With a styrene content of less than 5% by mass, the effects of the present invention may not be sufficiently achieved. The styrene content is also preferably 70% by mass or less, more preferably 60% by mass or less. A styrene content of more than 70% by mass may lead to reduced grip performance or durability of grip performance.

The amount of the low molecular weight diene polymer per 100 parts by mass of the rubber component is preferably 30 parts by mass or more, more preferably 50 parts by mass or more, still more preferably 60 parts by mass or more. The amount is also preferably 150 parts by mass or less, more preferably 120 parts by mass or less, still more preferably 100 parts by mass or less. An amount of less than the lower limit tends not to provide sufficient grip performance. An amount of more than the upper limit tends to lead to deteriorated rubber strength.

Preferably, the rubber composition of the present invention contains the high molecular weight diene polymer and the low molecular weight diene polymer, and the high molecular weight diene polymer and the low molecular weight diene polymer have respective SP values which satisfy the following relationship (3):

(SP value of high molecular weight diene polymer)× 2−(SP value of low molecular weight diene polymer)≤19.0.

In this case, it is possible to simultaneously achieve grip performance, durability of grip performance, and abrasion resistance.

In other words, the present invention is based on the finding (technical idea) that the balance of grip performance, durability of grip performance, and abrasion resistance is significantly improved particularly when the difference between twice the SP value of the high molecular weight diene polymer and the SP value of the low molecular weight diene polymer is 19.0 or less. Thus, the balance of the properties is significantly improved.

The value of (SP value of high molecular weight diene polymer)×2−(SP value of low molecular weight diene polymer) is 19.0 or less. The lower limit is not particularly critical, but is preferably 16.0 or more, more preferably 17.0 or more.

The SP value relationship (3) may be adjusted, for example, by controlling the styrene content of a high molecular weight styrene-butadiene copolymer or a low molecular weight styrene-butadiene copolymer. Specifically, the value of relationship (3) may be reduced, for example, by reducing the styrene content of a high molecular weight styrene-butadiene copolymer or increasing the styrene content of a low molecular weight styrene-butadiene copolymer. Using these tendencies, it can be adjusted.

The rubber composition preferably contains carbon black to improve the balance of the properties. Examples of usable carbon black include GPF, FEF, HAF, ISAF, and SAF.

The carbon black preferably has a nitrogen adsorption specific surface area ($N_2SA$) of 80 $m^2/g$ or more, more preferably 100 $m^2/g$ or more, still more preferably 130 $m^2/g$ or more. A $N_2SA$ of less than 80 $m^2/g$ tends to lead to reduced grip performance or abrasion resistance. The $N_2SA$ is preferably 280 $m^2/g$ or less, more preferably 220 $m^2/g$ or less, still more preferably 180 $m^2/g$ or less. Carbon black having a $N_2SA$ of more than 280 $m^2/g$ is less likely to disperse well and thus tends to result in reduced abrasion resistance. The nitrogen adsorption specific surface area of the carbon black is determined in accordance with JIS K 6217-2:2001.

The carbon black preferably has a dibutyl phthalate (DBP) oil absorption of 50 mL/100 g or more, more preferably 100 mL/100 g or more. A DBP oil absorption of less than 50 mL/100 g may not lead to sufficient abrasion resistance. The DBP oil absorption of the carbon black is also preferably 250 mL/100 g or less, more preferably 200 mL/100 g or less, still more preferably 135 mL/100 g or less. A DBP oil absorption of more than 250 mL/100 g may lead to reduced grip performance. The DBP oil absorption of the carbon black is determined in accordance with JIS K6217-4:2001.

The amount of carbon black per 100 parts by mass of the rubber component is preferably 10 parts by mass or more, more preferably 40 parts by mass or more, still more preferably 60 parts by mass or more. An amount of less than 10 parts by mass may lead to reduced abrasion resistance. The amount is preferably 200 parts by mass or less, more preferably 150 parts by mass or less, still more preferably 110 parts by mass or less. An amount of more than 200 parts by mass may lead to reduced processability.

The rubber composition may contain a terpenic resin.

Terpenic resins contain a terpene compound as a main component, and examples include terpene resins, terpene phenol resins, and aromatic modified terpene resins. The terpenic resin may be a hydrogenated terpenic resin produced via hydrogenation. The amount of the terpenic resin per 100 parts by mass of the rubber component is preferably 10 to 50 parts by mass, more preferably 20 to 40 parts by mass.

The rubber composition preferably contains a vulcanizing agent such as sulfur. Examples of the sulfur include powdered sulfur, precipitated sulfur, colloidal sulfur, insoluble sulfur, and highly dispersible sulfur.

The amount of the vulcanizing agent per 100 parts by mass of the rubber component is preferably 0.5 parts by mass or more, more preferably 1.0 part by mass or more. An amount of less than 0.5 parts by mass may lead to reduced hardness. The amount is preferably 3.0 parts by mass or less, more preferably 2.0 parts by mass or less. An amount of more than 3.0 parts by mass may lead to deteriorated abrasion resistance.

The rubber composition preferably contains a vulcanization accelerator. Examples of the vulcanization accelerator include thiazole vulcanization accelerators such as 2-mercaptobenzothiazole and di-2-benzothiazolyl disulfide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. Among these, sulfenamide vulcanization accelerators are preferred to more suitably achieve the effects of the present invention.

The amount of the vulcanization accelerator per 100 parts by mass of the rubber component is preferably 0.5 parts by mass or more, more preferably 1.0 part by mass or more, but is preferably 3.0 parts by mass or less, more preferably 2.0 parts by mass or less.

In addition to the above-mentioned components, the rubber composition of the present invention may appropriately contain other compounding agents commonly used in the tire industry, such as waxes, zinc oxide, stearic acid, and antioxidants.

The rubber composition of the present invention may be prepared by conventional methods. Specifically, for example, it may be prepared by kneading the components in a rubber kneading machine such as Banbury mixer, kneader, or open roll mill, and then vulcanizing the mixture.

The rubber composition of the present invention can be suitably used in treads of tires.

The pneumatic tire of the present invention may be formed from the rubber composition by usual methods. Specifically, the unvulcanized rubber composition containing additives as needed may be extruded into the shape of a tire component, and then formed in a usual manner on a tire building machine and assembled with various tire components to build an unvulcanized tire, which may then be heated and pressurized in a vulcanizer to produce a pneumatic tire of the present invention.

EXAMPLES

The present invention is specifically described with reference to examples, but is not limited thereto.

The chemicals used in the production examples are listed below.

Hexane: anhydrous hexane available from Kanto Chemical Co., Inc.

Isopropanol: special grade isopropanol available from Kanto Chemical Co., Inc.

TMEDA: tetramethylethylenediamine available from Kishida Chemical Co., Ltd.

THF: tetrahydrofuran available from Wako Pure Chemical Industries, Ltd.

Butadiene: 1,3-butadiene available from Takachiho Chemical Industrial Co., Ltd.

Styrene: styrene available from Wako Pure Chemical Industries, Ltd.

Production Example 1: Production of High Molecular Weight Diene Polymer A

An amount of 1,800 g of hexane, 160 g of butadiene, and 40 g of styrene together with 2.22 mmol of THF and 0.22 mmol of TMEDA were put in a dried and nitrogen-purged 3 L pressure-resistant stainless steel polymerization vessel. Next, a small amount of a solution of n-butyllithium in hexane was put in the polymerization vessel as a scavenger for preliminarily detoxifying impurities which serve to deactivate the polymerization initiator. After a solution of n-butyllithium in hexane (in an amount equivalent to 1.0 mmol n-butyllithium) was further added, a polymerization reaction was performed at 50° C. for three hours. Three hours later, 1.15 mL of a 1M solution of isopropanol in hexane was added dropwise to terminate the reaction. Subsequently, the polymerization solution was evaporated at room temperature for 24 hours, and further dried in vacuo at 80° C. for 24 hours to obtain a high molecular weight diene polymer A. The polymerization conversion ratio was almost 100%.

The high molecular weight diene polymer A had a Mw of 200,000, a Mw/Mn of 1.12, a styrene content of 41% by mass, and a calculated SP value of 17.9.

Production Example 2: Production of High Molecular Weight Diene Polymer B

A high molecular weight diene polymer B was prepared as in Production Example 1, except that the amounts of butadiene and styrene were changed to 132 g and 68 g, respectively. The polymerization conversion ratio was almost 100%.

The high molecular weight diene polymer B had a Mw of 200,000, a Mw/Mn of 1.12, a styrene content of 34% by mass, and a calculated SP value of 18.3.

Production Example 3: Production of High Molecular Weight Diene Polymer C

A high molecular weight diene polymer C was prepared as in Production Example 1, except that the amounts of butadiene and styrene were changed to 118 g and 82 g, respectively. The polymerization conversion ratio was almost 100%.

The high molecular weight diene polymer C had a Mw of 200,000, a Mw/Mn of 1.12, a styrene content of 34% by mass, and a calculated SP value of 18.5.

Production Example 4: Production of Low Molecular Weight Diene Polymer D

An amount of 1,800 g of hexane, 160 g of butadiene, and 40 g of styrene together with 2.22 mmol of THF and 0.22 mmol of TMEDA were put in a dried and nitrogen-purged 3 L pressure-resistant stainless steel polymerization vessel. Next, a small amount of a solution of n-butyllithium in hexane was put in the polymerization vessel as a scavenger for preliminarily detoxifying impurities which serve to deactivate the polymerization initiator. After a solution of n-butyllithium in hexane (in an amount equivalent to 40.0 mmol n-butyllithium) was further added, a polymerization reaction was performed at 50° C. for three hours. Three hours later, 2 L of a 1M solution of isopropanol in hexane was added dropwise to terminate the reaction. After removing the supernatant, the precipitate was evaporated at room temperature for 24 hours, and further dried in vacuo at 80° C. for 24 hours to obtain a low molecular weight diene polymer D (unhydrogenated). The polymerization conversion ratio was almost 100%.

The low molecular weight diene polymer D had a Mw of 5,200, a Mw/Mn of 1.10, a styrene content of 20% by mass, and a calculated SP value of 17.9.

Production Example 5: Production of Low Molecular Weight Diene Polymer E

A low molecular weight diene polymer E (unhydrogenated) was prepared as in Production Example 4, except that the amounts of butadiene and styrene were changed to 100 g and 100 g, respectively. The polymerization conversion ratio was almost 100%.

The low molecular weight diene polymer E had a Mw of 5,060, a Mw/Mn of 1.10, a styrene content of 50% by mass, and a calculated SP value of 18.9.

Production Example 6: Production of Low Molecular Weight Diene Polymer F

An amount of 200 g of the low molecular weight diene polymer D (unhydrogenated), 300 g of THF, and 10 g of 10% palladium carbon were put in a pressure-resistant vessel. The vessel was purged with nitrogen and then purged with hydrogen to a pressure of 5.0 kg/cm$^2$. A reaction was performed at 80° C. while repeating the hydrogen purge until the absorption of hydrogen ceased. Next, the reaction solution was filtrated to remove the catalyst. The filtrate was evaporated at room temperature for 24 hours, and further dried in vacuo at 80° C. for 24 hours to obtain a low molecular weight diene polymer F (hydrogenated).

The low molecular weight diene polymer F had a degree of hydrogenation of 95% and a calculated SP value of 17.7 (Mw: 5,200, Mw/Mn: 1.10, styrene content: 20% by mass).

Production Example 7: Production of Low Molecular Weight Diene Polymer G

A low molecular weight diene polymer G (hydrogenated) was prepared as in Production Example 6, except that the low molecular weight diene polymer D (unhydrogenated) was changed to the low molecular weight diene polymer E (unhydrogenated).

The low molecular weight diene polymer G had a degree of hydrogenation of 95% and a calculated SP value of 18.7 (Mw: 5,060, Mw/Mn: 1.10, styrene content: 50% by mass).

The polymers were analyzed as described below.
<Analysis of Polymer>
(1) The weight average molecular weight (Mw) and number average molecular weight (Mn) were determined using a GPC 8000 series device available from Tosoh Corporation and a differential refractometer as a detector, calibrated with the polystyrene standards.
(2) The styrene content was determined in accordance with JIS-K-6239.
(3) The degree of hydrogenation was determined as follows.

The proton NMR of the samples before and after the hydrogenation was measured at 25° C. using a JNM-A 400NMR spectrometer available from JEOL. From the obtained spectra, the rate of decrease in the methylene protons adjacent to the vinyl bonds in the butadiene units was calculated to determine the degree of hydrogenation.
(4) The SP value (MPa$^{0.5}$) was calculated by a group contribution method.

The chemicals used in the examples and comparative examples are listed below.

High molecular weight diene polymers A to C: polymers prepared in Production Examples 1 to 3

Low molecular weight diene polymers D to G: polymers prepared in Production Examples 4 to 7

Hydrogenated terpenic resin: Clearon M125 available from Yasuhara Chemical Co., Ltd.

Oil: Diana Process AH-24 available from Idemitsu Kosan Co., Ltd.

Carbon black SAF: Seast 9 (SAF, N$_2$SA: 142 m$^2$/g, DBP oil absorption: 115 mL/100 g) available from Tokai Carbon Co., Ltd.

Stearic acid: stearic acid "TSUBAKI" available from NOF Corporation

Zinc oxide: ZINCOX SUPER F1 available from HakusuiTech Co., Ltd.

Antioxidant: Antigene 6C available from Sumitomo Chemical Co., Ltd.

Sulfur: powdered sulfur available from Karuizawa sulfur Co., Ltd.

Vulcanization accelerator: NOCCELER CZ available from Ouchi Shinko Chemical Industrial Co., Ltd.

EXAMPLES AND COMPARATIVE EXAMPLES

According to each of the formulations indicated in Table 1, the components other than the sulfur and vulcanization accelerator were kneaded using a 1.7 L Banbury mixer at 150° C. for three minutes, and then combined with the sulfur and vulcanization accelerator, and they were kneaded using an open roll mill at 50° C. for five minutes to give an unvulcanized rubber sheet. Then, the unvulcanized rubber sheet was press vulcanized at 170° C. for 12 minutes to obtain a vulcanized rubber sheet.

Separately, the unvulcanized rubber sheet was formed into a tread shape and then assembled with other tire components on a tire building machine to build an unvulcanized tire. The unvulcanized tire was vulcanized at 170° C. for 12 minutes to produce a test tire.

A temperature dependence curve of tan δ of the vulcanized rubber sheet was prepared by the below-described test method to determine parameters including half-width and peak temperature. The processability during the production and the properties of the vulcanized rubber sheet and the test tire were evaluated by the test methods described below. The results are shown in The FIGURE and Table 1.

<Temperature Dependence Curve of Tan δ>

A temperature dependence curve of tan δ of the vulcanized rubber sheet was prepared using a spectrometer (Ueshima Seisakusho Co., Ltd.) at a strain of 0.1% and a frequency of 10 Hz.

<Hardness Index>

The hardness of the vulcanized rubber sheet was measured with a type A durometer in accordance with JIS K 6253 "Rubber, vulcanized or thermoplastic—Determination of hardness". Hardness indexes at 0° C. and 100° C. of each composition were calculated using the equation below, where the hardness at 0° C. of the composition of Comparative Example 1 was set equal to 100.

(Hardness index at 0° C. or 100° C. of each composition)=(Hardness at 0° C. or 100° C. of each composition)/(Hardness at 0° C. of Comparative Example 1)×100

It should be noted that since, as described above, the hardness indexes defined in the present invention are values of hardness relative to a certain hardness value used as the fixed denominator, the ratio (hardness index at 0° C.)/(hardness index at 100° C.) in Equation (2) of the present invention is equivalent to the ratio (hardness at 0° C.)/(hardness at 100° C.) Thus, Equation (2) serves as an indicator of properties of rubber compositions which does not depend on the value of Comparative Example 1.

<Processability>

The degree of adhesion of the rubber kneaded during the Banbury mixing step and the open roll milling step was evaluated on the following 3-point scale.

Good: Almost no adhesion observed, no problem

Fair: Some adhesion observed, the rubber takes longer to discharge than that rated as "Good"

Poor: Extreme adhesion observed, the rubber takes longer to discharge than that rated as "Fair"

<Bleed Resistance>

The surface of the test tire was visually observed to determine the degree of bleeding of oily substances.

Good: No bleeding

Fair: Slight bleeding

Poor: Severe bleeding

<Grip Performance>

A test driver drove a car with a set of the test tires on a test track under dry asphalt surface conditions and then evaluated the stability of steering control. The results are expressed as an index, with Comparative Example 1 set equal to 100. A higher index indicates higher grip performance, i.e. better grip performance. The ratings on the first to third laps, the fourth to seventh laps, and the eighth to tenth laps are taken as early-phase grip, middle-phase grip, and late-phase grip, respectively.

<Abrasion Resistance>

A car with a set of the test tires was run on a test track under dry asphalt surface conditions. Then, the abrasion resistance was evaluated based on the remaining groove depth in the tire tread rubber. The larger the remaining groove depth, the better the abrasion resistance. The remaining groove depths are expressed as an index, with Comparative Example 1 set equal to 100. A higher index indicates higher abrasion resistance.

TABLE 1

| | | | Comparative Example | | | Example | | | | | | | |
|---|---|---|---|---|---|---|---|---|---|---|---|---|---|
| | | | 1 | 2 | 3 | 1 | 2 | 3 | 4 | 5 | 6 | 7 | 8 |
| Formulation (parts by mass) | High molecular weight diene polymer | A | — | — | — | — | — | — | — | — | — | 100 | 100 |
| | | B | — | — | — | — | — | 100 | 100 | 100 | 100 | — | — |
| | | C | 100 | 100 | 100 | 100 | 100 | — | — | — | — | — | — |
| | Low molecular weight diene polymer | D | 80 | — | 40 | — | — | — | — | 80 | — | 80 | — |
| | | E | — | — | 40 | 80 | — | 80 | — | — | — | — | — |
| | | F | — | 80 | — | — | — | — | — | — | 80 | — | 80 |
| | | G | — | — | — | — | 80 | — | 80 | — | — | — | — |
| | Other components | Hydrogenated terpenic resin | 30 | 30 | 30 | 30 | 30 | 30 | 30 | 30 | 30 | 30 | 30 |
| | | Oil | 20 | 20 | 20 | 20 | 20 | 20 | 20 | 20 | 20 | 20 | 20 |
| | | Carbon black SAF | 80 | 80 | 80 | 80 | 80 | 80 | 80 | 80 | 80 | 80 | 80 |
| | | Stearic acid | 2 | 2 | 2 | 2 | 2 | 2 | 2 | 2 | 2 | 2 | 2 |
| | | Zinc oxide | 3 | 3 | 3 | 3 | 3 | 3 | 3 | 3 | 3 | 3 | 3 |
| | | Antioxidant | 1 | 1 | 1 | 1 | 1 | 1 | 1 | 1 | 1 | 1 | 1 |
| | | Sulfur | 1.5 | 1.5 | 1.5 | 1.5 | 1.5 | 1.5 | 1.5 | 1.5 | 1.5 | 1.5 | 1.5 |
| | | Vulcanization accelerator | 1.5 | 1.5 | 1.5 | 1.5 | 1.5 | 1.5 | 1.5 | 1.5 | 1.5 | 1.5 | 1.5 |

TABLE 1-continued

|  |  | Comparative Example ||| Example ||||||||
|---|---|---|---|---|---|---|---|---|---|---|---|---|
|  |  | 1 | 2 | 3 | 1 | 2 | 3 | 4 | 5 | 6 | 7 | 8 |
| Parameters | (SP value of high molecular weight diene polymer) × 2 − (SP value of low molecular weight diene polymer) | 19.1 | 19.3 | 18.8 | 18.1 | 18.3 | 17.7 | 17.9 | 18.7 | 18.9 | 17.9 | 18.1 |
|  | Peak temperature | 10.7 | 11.8 | 5.8 | 3.9 | 6.6 | 0.7 | 1.5 | −2.5 | −1.3 | −1.3 | −2.5 |
|  | Half-peak height | 0.29 | 0.29 | 0.35 | 0.4 | 0.4 | 0.39 | 0.39 | 0.39 | 0.39 | 0.42 | 0.43 |
|  | Temperature at half-peak height on low temperature side (° C.) | −22 | −22 | −15 | −8 | −8 | −13 | −13 | −15 | −15 | −18 | −18 |
|  | Temperature at half-peak height on high temperature side (° C.) | 25 | 27 | 26 | 26 | 27 | 20 | 18 | 22 | 22 | 22 | 21 |
|  | Half-width | 47 | 49 | 41 | 34 | 35 | 33 | 31 | 37 | 37 | 40 | 39 |
|  | Hardness index (100° C.) | 22 | 23 | 23 | 26 | 28 | 23 | 24 | 22 | 23 | 22 | 22 |
|  | Hardness index (0° C.) | 100 | 102 | 102 | 96 | 98 | 92 | 93 | 91 | 92 | 84 | 88 |
|  | Hardness index (0° C.)/Hardness index (100° C.) | 4.5 | 4.4 | 4.4 | 3.7 | 3.5 | 4.0 | 3.8 | 4.1 | 4.0 | 3.8 | 4.0 |
| Properties | Processability | Fair | Poor | Fair | Good | Good | Good | Good | Good | Good | Good | Good |
|  | Bleed resistance | Fair | Poor | Fair | Good | Good | Good | Good | Good | Good | Good | Good |
|  | Early-phase grip | 100 | 95 | 95 | 107 | 114 | 118 | 117 | 121 | 123 | 126 | 122 |
|  | Middle-phase grip | 100 | 105 | 105 | 110 | 115 | 112 | 121 | 115 | 114 | 111 | 115 |
|  | Late-phase grip | 100 | 105 | 102 | 112 | 115 | 113 | 118 | 112 | 117 | 112 | 117 |
|  | Abrasion resistance | 100 | 105 | 100 | 102 | 112 | 104 | 115 | 104 | 117 | 121 | 123 |

The results in Table 1 and The FIGURE show that, in the examples which exhibited a temperature dependence curve of tan δ with a half-width of 45 or less and a peak temperature of 10° C. or lower as measured under specific conditions, and further which had a temperature dependence of hardness defined by Equation (2) of 4.3 or less, not only excellent grip performance and durability of grip performance but also excellent abrasion resistance were obtained, and thus these properties were simultaneously achieved. Moreover, it is demonstrated that excellent processability and bleed resistance were also obtained, and therefore the balance of grip performance, durability of grip performance, and abrasion resistance was significantly improved while providing good processability and bleed resistance.

The invention claimed is:

1. A pneumatic tire, formed from a rubber composition, the rubber composition exhibiting a temperature dependence curve of tan δ with a half-width defined by Equation (1) of 45 or less as measured at a strain of 0.1% and a frequency of 10 Hz, the rubber composition having a temperature dependence of hardness defined by Equation (2) of 4.3 or less, the temperature dependence curve having a peak temperature of 10° C. or lower, half-width=(temperature at half-peak height on high temperature side)−(temperature at half-peak height on low temperature side),   Equation (1):

temperature dependence of hardness=(hardness index at 0° C.)/(hardness index at 100° C.).   Equation (2):

2. The pneumatic tire according to claim 1, wherein the rubber composition comprises: a high molecular weight diene polymer having a weight average molecular weight of 100,000 or more; and a low molecular weight diene polymer having a weight average molecular weight of 50,000 or less, and the high molecular weight diene polymer and the low molecular weight diene polymer have respective SP (solubility parameter) values which satisfy the following relationship (3):

(SP value of high molecular weight diene polymer)× 2−(SP value of low molecular weight diene polymer)≤19.0.

\* \* \* \* \*